(12) United States Patent
Keskitalo et al.

(10) Patent No.: US 6,345,188 B1
(45) Date of Patent: *Feb. 5, 2002

(54) BASE STATION FOR PHASING A TRANSMISSION SIGNAL TO A MOBILE UNIT BASED ON INFORMATION RECIEVED FROM THE MOBILE UNIT

(75) Inventors: Ilkka Keskitalo, Oulu; Peter Muszynski, Espoo; Jaana Laiho-Steffens, Veikkola, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 08/971,218

(22) PCT Filed: May 23, 1996

(86) PCT No.: PCT/FI96/00289

§ 371 Date: Nov. 14, 1997

§ 102(e) Date: Nov. 14, 1997

(87) PCT Pub. No.: WO96/37974

PCT Pub. Date: Nov. 28, 1996

(30) Foreign Application Priority Data

May 24, 1995 (FI) .................................................. 952531

(51) Int. Cl.[7] .................................................. H04B 1/38
(52) U.S. Cl. ..................... 455/561; 455/562; 455/277.2
(58) Field of Search .................................. 455/561, 562, 455/440, 524, 525, 277.2

(56) References Cited

U.S. PATENT DOCUMENTS

| 4,451,699 A | * | 5/1984 | Gruenberg | 455/62 |
| 5,095,535 A | * | 3/1992 | Freeburg | 455/278 |
| 5,127,025 A | | 6/1992 | Okanoue | |
| 5,303,240 A | | 4/1994 | Borras et al. | |
| 5,351,274 A | * | 9/1994 | Chennakeshu et al. | |
| 5,513,176 A | * | 4/1996 | Dean et al. | 455/276 |
| 5,621,752 A | * | 4/1997 | Antonio et al. | 455/432 |
| 5,781,541 A | * | 7/1998 | Schneider | 370/335 |

(List continued on next page.)

FOREIGN PATENT DOCUMENTS

EP         249 292         12/1987

OTHER PUBLICATIONS

Naguib et al: "Performance of CDMA Cellular Networks with Bae–Station Antenna Arrays", Proc. International Zurich Seminar on Digital Communication, pp. 87–100, Mar. 1994.

Xu et et: "Experimental Studies of Space–Division–Multiple–Access Schemes for Spectral Efficient Wireless communications", IEEE Int'l Conf. on Comm. ICC 1994, IEEE 1994, 17/03 '95, 07:55, pp. 800–804.

*Primary Examiner*—William Trost
*Assistant Examiner*—Tilahun Gesesse
(74) *Attorney, Agent, or Firm*—Pillsbury Winthrop LLP

(57) ABSTRACT

An apparatus and method of steering a signal from a base station is disclosed. The base station comprises one or more antenna arrays, one or more channel units, the channel units comprising means for phasing the signal to be transmitted and received in such a way that the gain from the antenna array is greatest in a specified direction. Further, the base station includes means for distinguishing connection quality information from information received from the mobile station. In order to improve the spectral efficiency and the connection quality, the channel unit comprises means for searching for the incoming directions and delays of the received signal components, and means for controlling the phasing means of the signal transmitted to the mobile on the basis of the information and the connection quality information received from the mobile station.

24 Claims, 6 Drawing Sheets

U.S. PATENT DOCUMENTS 5,806,001 A  *  9/1998  Yokota ........................ 455/507
5,893,033 A  *  4/1999  Keskitalo et al. ............ 455/437
5,914,946 A  *  6/1999  Avidor et al. ................ 370/336
5,966,670 A  * 10/1999  Keskitalo et al. ............ 455/561
6,006,113 A  * 12/1999  Meredith ..................... 455/562
6,073,032 A  *  6/2000  Keskitalo et al. ............ 455/561
6,091,788 A  *  7/2000  Keskitalo et al. ............ 455/561
6,212,406 B1 *  4/2001  Keskitalo et al. ............ 455/561

* cited by examiner

BASE STATION FOR PHASING A TRANSMISSION SIGNAL TO A MOBILE UNIT BASED ON INFORMATION RECIEVED FROM THE MOBILE UNIT

This application is the national phase of international application PCT/F196/289 filed May 23, 1996 which designated the U.S.

BACKGROUND OF THE INVENTION

The invention relates to a base station equipment for receiving and transmitting a signal of a desired user, which signal to be received may arrive at the equipment along several different paths with several different delays, and which equipment comprises one or more antenna arrays consisting of several elements, one or more channel units, which channel unit comprises means for phasing the signal to be transmitted and received by the antenna array in such a way that the gain from the antenna array is the greatest in the desired direction, and means for distinguishing the symbols comprising connection quality information from the signal received from the mobile station.

The present invention is applicable for use in a data transmission system applying any multiple access method, but especially in a cellular system utilizing code division multiple access. Code division multiple access (CDMA) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning. An example of a known CDMA system is the broadband cellular radio standard EIA/TIA IS-95.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the different users can be distinguished from one another in the receivers on the basis of the spreading code of each user.

Matched filters provided in the receivers are synchronized with a desired signal, which they recognize on the basis of a spreading code. The data signal is restored in the receiver to the original band by multiplying it again by the same spreading code that was used during the transmission. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. In the CDMA, the multipath propagation can be exploited in the reception of the signal in the same way as diversity. The receiver generally utilized in a CDMA system is a multi-branch receiver structure where each branch is synchronized with a signal component which has propagated along an individual path. Each branch is an independent receiver element, the function of which is to compose and demodulate one received signal component. In a conventional CDMA receiver, the signals of the different receiver elements are combined advantageously, either coherently or incoherently, whereby a signal of good quality is achieved.

CDMA systems can also apply a soft handover wherein a mobile station may simultaneously communicate with several base stations by utilizing macrodiversity. The connection quality of the mobile station thus remains high during the handover and the user does not notice a break in the connection.

Interference caused by other connections in the desired connection thus appears in the receiver as noise that is evenly distributed. This is also true when a signal is examined in an angular domain according to the incoming directions of the signals detected in the receivers. The interference caused by the other connections in the desired connection thus also appears in the receiver as distributed in the angular domain, i.e. the interference is rather evenly distributed into the different incoming directions.

The capacity of the CDMA, which can be measured by means of spectral efficiency, has been further improved with sectorization. A cell is then divided into sectors of a desired size that are serviced by directional antennas. The mutual noise level caused by the mobile stations can thus be reduced significantly in the base station receiver. This is based on the fact that on average the interference is evenly distributed between the different incoming directions, the number of which can thus be reduced by means of sectorization. The sectorization can naturally be implemented in both transmission directions. The advantage provided in the capacity by the sectorization is-proportional to the number of the sectors.

A sectorized cell may also utilize a special form of soft handover, softer handover, wherein a mobile station performs a handover from one sector to another by communicating simultaneously with both sectors. Even though soft handover improves the connection quality and sectorization increases the system capacity, the movement of the mobile stations naturally leads to the stations performing several handovers from one sector to another. This loads the processing capacity of the base station controller. Several soft handovers also produce a situation where several mobile stations communicate simultaneously with more than one (usually two) sector, whereby the increased capacity provided by the sectorization is lost as a signal of a mobile station is audible in a wide sector.

The multiple access interference of the CDMA systems has also been reduced by means of different known multiple access interference cancellation (IC) methods and multi-user detection (MUD). These methods are best suited for reducing the interference produced within the user's own cell, and the system capacity can thus be increased to about a double compared to a system implemented without interference cancellation. However, these methods do not significantly improve the size of the coverage area of the base station compared to known technology. Also, the IC/MUD techniques are complicated to realize, wherefore they have mainly been developed in the uplink direction.

Another method that has been developed is an SDMA (Space Division Multiple Access) method wherein the users are distinguished from one another on the basis of their location. This is performed in such a way that the beams of the receiver antennas at the base station are adjusted to the desired directions according to the location of the mobile stations. For this purpose, the system uses adaptive antenna arrays, i.e. phased antennas, and the processing of the received signal, by means of which the mobile stations are tracked.

The use of the SDMA in connection with the CDMA provides several advantages over the prior methods, such as sectorization. If the sector beams in the sectorization are narrowed in order to increase the spectral efficiency, the number of the handovers to be performed from one sector to another also increases. This in turn increases too much the calculation capacity required in the base station controller.

In connection with the application of the SDMA, the background art is illustrated in A. F. Naguib, A. Paulraj: Performance of CDMA Cellular Networks With Base-Station Antenna Arrays (Proc. International Zürich Seminar on Digital Communications, pp. 87–100, Zürich, Switzerland, March 1994), which is incorporated herein by reference. In the SDMA a signal is thus received by means of an antenna array, and the received signal is shaped by means of digital signal processing in such a way that the directivity patterns of the antennas are suitable for the stages following the shaping in the receiver. In prior art arrangements, the received signal is shaped in order to maximize the signal-to-interference ratio of the desired signal. The received signal is thus shaped in such a way that the directivity pattern of the antenna array minimizes the interference caused by the other connections in the desired signal. In the arrangement according to the aforementioned reference, each detected signal component is subjected to individual beam shaping, i.e. the impulse response must be known before the shaping.

Experimental Studies of Space-Division-Multiple-Access Schemes for Spectral Efficient Wireless Communications by G. Xu, H. Liu, W. J. Vogel, H. P. Lin, S. S. Jeng and G. W. Torrence (IEEE Int. Conf. On Comm. ICC 1994, New Orleans, USA, IEEE 1994), which is incorporated wherein by reference, discloses a method which applies the SDMA and in which the directivity pattern of the transmitter antennas is shaped. However, the method disclosed is suitable for use only in systems where both transmission directions are on the same frequency.

BRIEF SUMMARY OF THE INVENTION

The purpose of the present invention is to realize a base station equipment and a method for steering transmission antennas, by means of which the spectral efficiency can be improved further compared to the prior CDMA systems, so that the technical implementation of the equipment will still be advantageous and wherein a connection of good quality can be maintained between a base station and a mobile station even in difficult propagation conditions of radio-waves. The purpose of the invention is to apply the SDMA efficiently in a CDMA environment by utilizing new type of multidimensional search and the connection quality information transmitted by a mobile station. The application of the invention does not require both of the transmission directions to be on the same frequency.

This is achieved with a base station equipment of the type described in the preamble, characterized in that the channel unit comprises means for searching for the incoming directions and delays of the received signal components, and means for controlling the phasing means of the opposite transmission direction on the basis of said information and the connection quality data received from the mobile station.

The invention also relates to a method for steering an antenna beam in a base station equipment, in which method a signal is received and transmitted by means of an antenna array consisting of several elements by phasing the signal to be received and transmitted in such a way that the gain from the antenna array is the greatest in the desired directions, and wherein a mobile station transmits to the base station information about the quality of the signal it has received from the base station. The method according to the invention is characterized in that in the base station equipment, the incoming directions and delays of the signal components received from the mobile station are searched for, and that the phasing of the signal to be transmitted in the opposite transmission direction is controlled on the basis of said measurement and the connection quality information received from the mobile station.

The method according to the invention provides considerably better spectral efficiency when compared to the conventional cellular systems, including systems applying the CDMA method. The method increases both the number of the channels used by a factor of 10 to 100, and the size of the coverage area of the base station by a factor of 5 to 10. This is based on that fact that the interference to the other users decreases significantly in the downlink transmission direction, when the signal is steered during the transmission in the directions from which the signal components from the mobile station were received advantageously at the base station. On the basis of the connection quality information transmitted by the mobile station, it is possible to rapidly react to changing propagation conditions and to alter the beams and powers of the transmission antennas.

According to the first preferred embodiment of the invention, the signal processing can be performed digitally on the base band, whereupon the antenna beams can be steered directly to the desired directions by means of the phasing of the received signal. In the second preferred embodiment of the invention, the signal phasing is performed analogically, thus resulting in a number of fixed antenna beams from which the beams receiving the best components of the desired signal are selected for the reception.

BRIEF DESCRIPTION OF THE SEVERAL VIEWS OF THE DRAWINGS

In the following, the preferred embodiments of the invention will be described in greater detail with reference to the examples according to the accompanying drawings, in which.

DETAILED DESCRIPTION OF THE INVENTION

In the following, the method and equipment according to the invention will be described in greater detail using the CDMA system as an example, but not restricting the description thereto, however, since the invention is also applicable in connection with other multiple access methods, as will be evident for a person skilled in the art on the basis of the description below.

Figure 1:
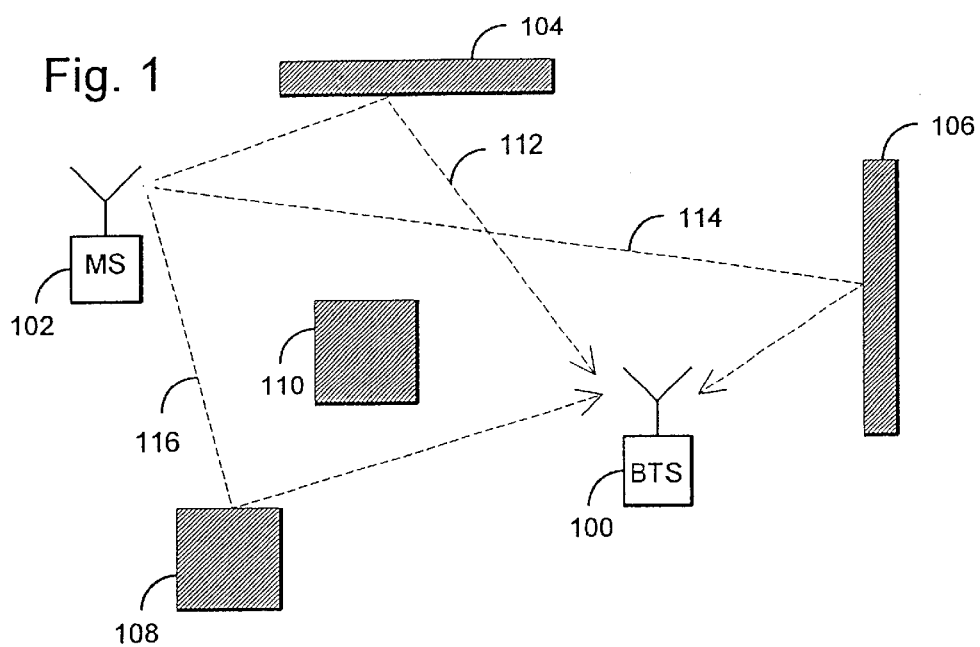
FIG. 1 illustrates the multipath propagation of a signal between a mobile station and a base station.

FIG. 1 illustrates the typical multipath propagation of a transmitted signal in a cellular system. The figure shows a base station 100 and a mobile subscriber equipment 102 communicating with the base station. A characteristic feature of cellular radio systems is that the mobile stations are surrounded by surfaces that reflect and scatter radiowaves. Such surfaces may be for example buildings and walls formed by the nature, such as mountains and hills. Mobile stations typically transmit with an omnidirectional antenna pattern. The figure illustrates a few rays 112, 114, 116 originating from a mobile station. The surfaces 104, 108 situated close to the mobile station 102 reflect the transmitted signal, which therefore arrives at the antenna of the base station 100 along several different paths, but the delay between the different signal components is rather small, however. The reflecting surfaces situated further, in the FIG. 106, such as larger buildings and mountains, produce signal components 114 which arrive at the base station 100 several, even dozens of microseconds later. There may also be obstacles 110 in the terrain that prevent a direct connection between the mobile station and the base station.

Figure 2A:
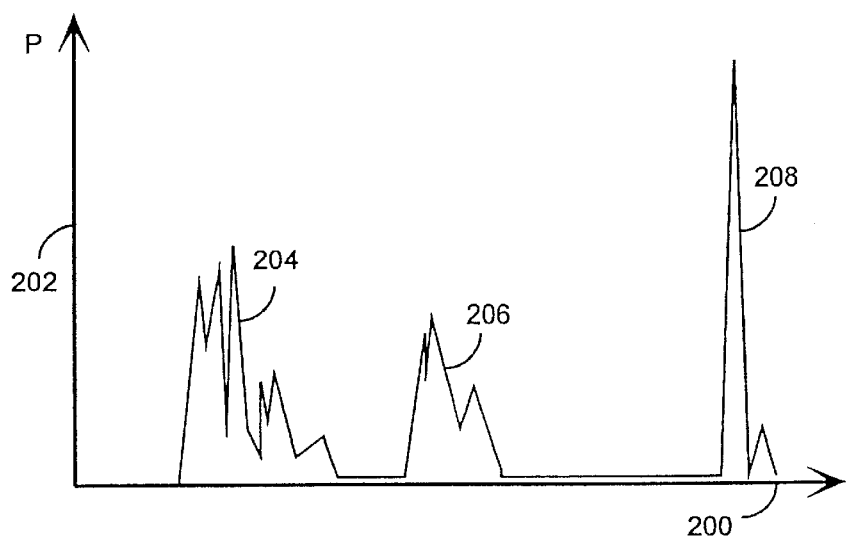
FIG. 2a illustrates, on a time domain, the scattering caused by the multipath propagation of a signal.

FIG. 2a illustrates, on the time domain, an example of a momentary delay of signal components caused by the multipath propagation of the signal at a base station receiver. The horizontal axis 200 of the schematic figure shows the time and the vertical axis 202 shows the power of the received signal. In the example of FIG. 2a, the base station receiver has detected three groups of signal components 204, 206, 208 which have arrived at the receiver at different times and among which the component 208 is significantly more delayed than the others.

Figure 2B:
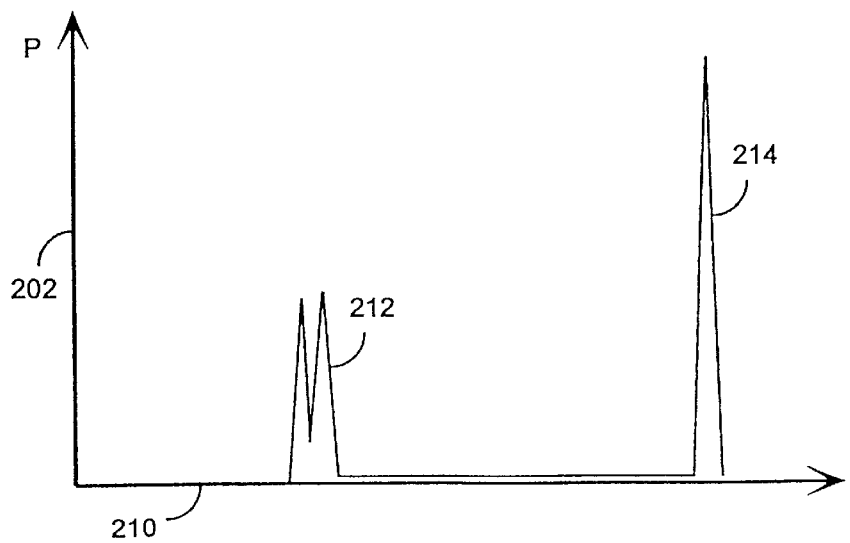
FIG. 2b illustrates, on the angle-of-arrival domain, the scattering caused by the multipath propagation of a signal.

As the example of FIG. 1 shows, the different signal components arrive not only at different times but also from different directions. It can thus be said that the signal scatters not only in the time domain, but also in the angular domain, which can be described by the angle of arrival (AoA) of the signal. FIG. 2b illustrates an example of a momentary scattering as a function of the angle of arrival, caused by the multipath propagation of the signal, at the base station receiver. The vertical axis 202 of FIG. 2b shows the power of the received signal component, and the horizontal axis 210 shows the angle of arrival. In the example of FIG. 2b, the signal components 212, 215 arrive from two directions.

In large cells, so-called macrocells, wherein the base station antennas are situated high, the signal components generally arrive at the antenna with only a few different angles of arrival, which are usually at the vicinity of the direct ray between the mobile station and the base station. In small microcells where the base station antennas are usually situated below the roofs of buildings, the angles of arrival of the signal components are found to show far greater dispersion, since in the same way as the mobile stations, the base stations are often surrounded by several reflecting surfaces situated near by.

The multipath propagation has been described above in the uplink transmission direction. It is naturally clear that a corresponding phenomenon also occurs in the opposite downlink direction. It can also be stated that the multipath routes are mainly symmetrical in both directions, since the scattering and reflection are not greatly dependent on the frequency. However, it should be noted that fast signal fadings are mutually independent in different transmission directions. Therefore, if the base station detects a signal component that has arrived from the mobile station at the angle of arrival of $\alpha_0$, transmitting a signal with the same angle $\alpha_0$ guides the signal in the direction of the mobile station, except for fast fadings.

On the basis of the above, it can be stated that the multipath propagating environment typical of cellular systems leads in the base stations to the reception of a signal which is distributed in time into several components that are delayed differently and in the angular domain into components arriving from several different directions. Both distribution profiles vary in time since the subscriber equipments move, but the variation is rather slow, i.e. in the range of a few seconds, and the profiles can be synchronized with and they can be monitored.

The received signal components are thus characterized by the multidimensionality of the type described above that is illustrated above with the time-angular domain, i.e. $(\alpha, \tau)$ domain, and that can be utilized in the base station according to the invention for improving the detection of the signal to be received. In the method according to the invention, the best signal components of the received signal are searched for in the multidimensional signal domain, the receiver being controlled by means of the components in such a way that the detected components can be preferably combined and detected. The most simple standard for the signal quality can be the received power level, but also other standards can be used, for example the signal-to-noise ratio.

Figure 3:
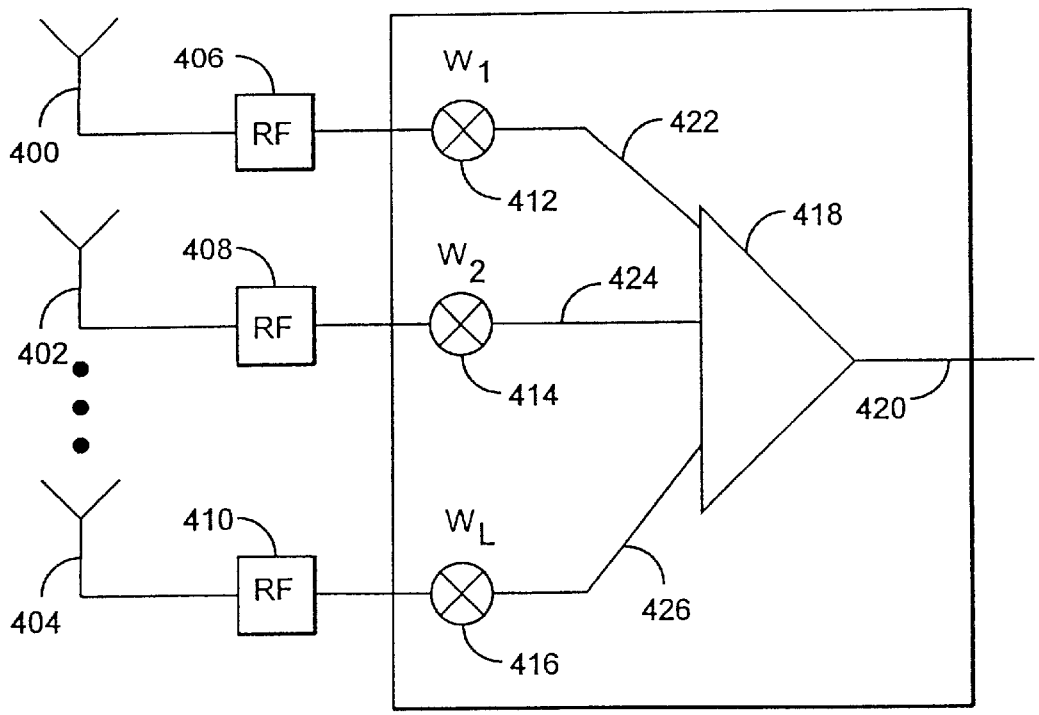
FIG. 3 shows a possible implementation of an adaptive antenna array.

The equipment according to the invention utilizes an adaptive antenna array, which is an antenna array consisting of several different elements. FIG. 3 illustrates a possible implementation of an adaptive antenna array, which can be applied in connection with the first preferred embodiment of the invention. The antenna array comprises L antenna elements 400, 402, 404, which may be for example omnidirectional antennas. Each antenna element is connected to radio-frequency parts 406, 408, 410, which convert the received signal into an intermediate frequency and sample the signal into (I,Q) components according to known technology. The obtained complex samples are then multiplied by the corresponding complex weighting coefficients $W_i$, wherein i=1, . . . , L, in multipliers 412, 414, 416. The samples 422, 424, 426 that have thus been multiplied are applied via an adder 418 to other parts of the receiver.

The complex weighting coefficients $W_i$ are selected according to an algorithm, which is usually adaptive, in such a way that an antenna pattern of the desired shape is achieved. This manner of shaping the received signal can be called digital phasing of the signal, since it is performed on a signal digitized on the base band, but due to this shaping the received signal antenna gain can be oriented in the desired directions. An antenna array as such may comprise either directional or omnidirectional antenna elements. Phasing the signal obtained from the different antennas and combining the phased signals produces kind of virtual antenna beams into the desired directions. A corresponding treatment can also be performed on the signal to be transmitted, whereby a desired radiation pattern can be achieved.

Figure 4:
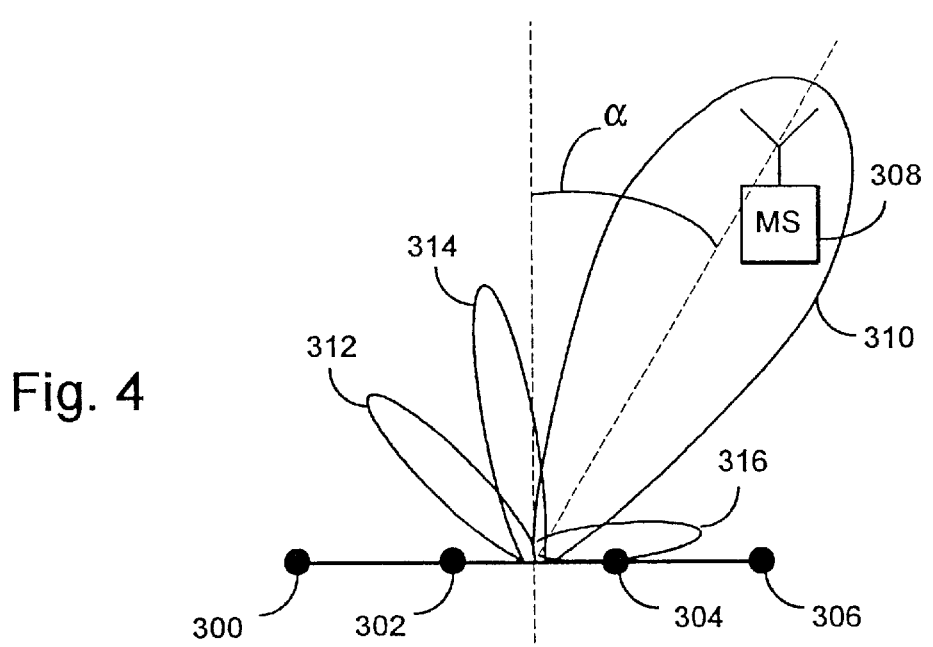
FIG. 4 illustrates a possibility of steering the beam of the base station antennas towards the mobile station.

FIG. 4 illustrates how an antenna array consisting of an evenly spaced linear group comprising four elements 300, 302, 304, 306 produces a strong directed beam 310 with the angle of arrival of α towards a mobile station 308. A group of smaller side beams 312 to 316 are also formed. This directivity can thus be implemented with the signal phasing without the antennas as such being directional.

In the arrangement according to the invention, the multiple access interference of the receiver is reduced with antenna beams that are directed in the angular domain and that are produced by means of a new type of receiver applying time-angle diversity. In the arrangement according to the invention, the angles of arrival measured from the received signal can also be used in the transmission direction, whereby the connection quality is improved in both transmission directions.

In the following, the first preferred embodiment of the invention, which relates to applying the digital phasing of the signal in the CDMA system, will be described first.

The receiver applying time-angle diversity used at the base station comprises digital receiver means that can monitor the received signal components in the two-dimensional $(\alpha, \tau)$ domain and demodulate the desired signal components. Before the demodulation, the received digitized signal samples are subjected to phasing by means of which the antenna gain of the received signal is oriented in the desired signal incoming directions. In the preferred embodiment, the antenna beams produced by the phasing are beams having a predetermined shape that is determined by the weighting coefficients $W_i$ and the antenna geometry. These coefficients can easily be calculated for each angle of the greatest gain if the shape of the antenna beam as such remains constant. Therefore, the phasing can be adjusted rapidly since it is only dependent on one parameter, i.e. the angle of arrival α.

In the method according to the invention, there is no need to apply known complicated techniques, such as MUSIC, for estimating the angle of arrival or adaptive algorithms, such as LMS and DMI. Even though these algorithms enable the calculation of the optimal beam shape for the signal to be received, so that the signal-to-noise ratio of the desired signal can be maximized by directing the zero points of the antenna pattern towards the sources of interference, this is not necessary in connection with the CDMA since, as described above, in the CDMA the interference signal is distributed to resemble noise without having any clear directions of interference source. Therefore, it is sufficient in an environment with evenly distributed interference that the angles of the greatest gain of the antenna beams having a predetermined shape are pointed in the directions from which the best signal components are received. This enables the implementation of a more simple receiver compared to the prior art.

In the method according to the invention, the receiver thus searches for the desired signal components in the $(\alpha, \tau)$ domain. This is performed by cross-correlating the received spread-spectrum signal with the desired spreading code and by comparing the obtained measurement results with the threshold values given. The search can be understood as a sweep of an antenna beam over the given area, simultaneously performing the measurement of the channel impulse response and the collection of the signal energy of the terminal equipments received from each direction. The receiver thus detects the direction and code phase of the reception of the best signals and allocates a required number of demodulation means for synchronizing with and receiving these signal components. The received demodulated signal components can be preferably combined in the receiver. The search for the best signal components is performed continuously and the allocation of the demodulation means is changed, if necessary.

The receiver thus knows at all times the directions from which the best signal components from the mobile stations are received. This information can also be used in the base station equipment according to the invention in the downlink direction. This may be performed for example in such a manner that the controller of the transmitter-receiver informs the transmitter unit of the directions where significant signal components have been detected. The transmitter unit may phase the signal to be transmitted with the adaptive antenna array in such a way that the angles of the greatest gain of the antenna beams point in the desired directions. There may be one or more transmission beams and their number may also differ from the number of the receiver beams.

This method provides considerable interference cancellation also in the downlink direction. The antenna array used in the transmission may be the same as the antenna array used in the reception. It may also be a separate antenna array. The signal phasing is performed in the same way as during the reception with the weighting coefficients.

The arrangement according to the invention may use for example prior art mobile stations, which continuously perform measurements on the connection quality from the signal they have received from the base station. This information may comprise for example data concerning the number of the signal components the mobile station has received, the relative power levels and relative delays of the signal components or the signal-to-noise ratio of each signal component.

The arrangement according to the invention utilizes the results of the connection quality measurements performed by the mobile station when the beams of the transmission antennas are directed in the downlink direction. The principle is to improve the total quality of the downlink transmission direction by optimizing the weighting of the transmission beams. By means of the measurement results, the weightings of the antenna beams can be changed in such a way that either the components providing the best signal quality are weighted, or the components providing the poorest quality are improved.

The mobile station transmits the measurement results it has collected to the base station. On the basis of the information received from the mobile station and the measurements it has performed itself, the base station may vary the number, shape or direction of the antenna beams it uses for the transmission of the signal intended to the mobile station. These changes can be implemented gradually, so that the mobile station can follow the changing signal.

The base station may also use the connection quality information it has received from the mobile station for adjusting the transmit power of each antenna beam if the measurement results show that the aforementioned measures do not improve the signal quality in the mobile station.

One advantage of the method described above is that for example in a difficult fading situation the mobile station may transmit to the base station a request to change the parameters of the antenna beams used in the signal transmission, for example the direction, shape and number, whereby the quality of the signal received by the mobile station can be improved rapidly.

The prior art CDMA systems use a pilot signal that is transmitted by each base station and that is used in the identification of base stations, in power measurement and for enabling coherent reception in a mobile station. In known systems, a pilot signal that is a data-unmodulated spreading-coded signal is transmitted to the coverage area of the base station in the same way as the actual traffic channels.

A CDMA system implemented in the manner according to the invention may apply such a method for transmitting a pilot signal that uses antenna beams changing in time in the transmission and reception of data signals. It is then possible to transmit a first pilot signal in a transmission direction that is constant in time, and second pilot signals in transmission directions that change in time and that may correspond to the transmission directions used in the transmission of the data signals.

Therefore, a pilot signal provided with transmission directions that remain constant in time can be used for the detection of a base station and for power measurements for detecting a need for a handover. Since the antenna directivity pattern used differs from the pattern of the data signals, the signal cannot be used as a reference for coherent detection. It is possible to use for this purpose a pilot signal that is transmitted with the same antenna pattern in connection with each data signal and that therefore propagates along the same path as the actual data signal and that enables coherent detection in mobile stations.

In the arrangement according to the invention, a pilot signal can further be transmitted using a relatively narrow antenna beam, and the angle of the greatest gain of this antenna beam can be directed in such a way that the antenna beam sweeps the cell area. Thus the antenna beam comprising the pilot signal sweeps the cell like a lighthouse, and the transmission of a continuous pilot to the entire cell area can be avoided. The pilot can also be transmitted with several sweeping antenna beams, which are phased in such a way that they do not overlap. The base station informs the mobile stations on a control channel about the time when the pilot channel sweeps each area.

Figure 5:
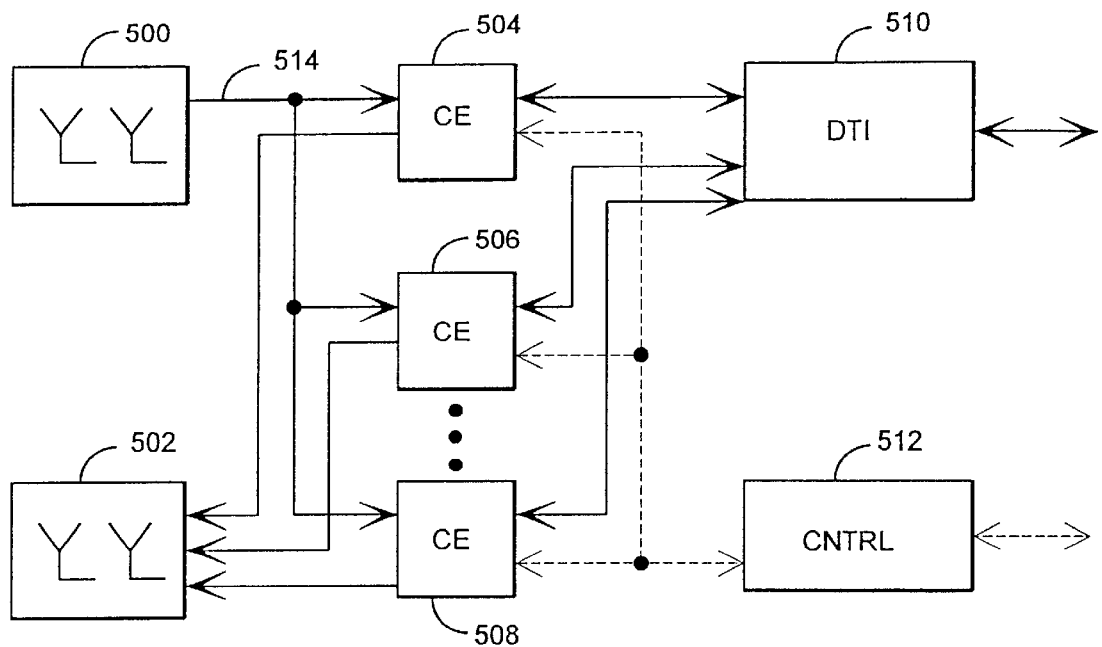
FIG. 5 is a block diagram illustrating a possible structure of an equipment according to the invention.

In the following, the structure of an equipment according to the first embodiment of the invention will be described. FIG. 5 is a block diagram illustrating the structure of an equipment according to the invention. The equipment comprises an antenna array 500 consisting of L separate antenna elements. The antenna array may be linear, planar (two-dimensional) or omnidirectional. The antenna array 500 receives a multipath-propagated signal that is delayed in different ways from several different directions from each mobile station with each of the L elements, performs the preamplification, converts the signal into an intermediate frequency and digitizes all the L signals. The obtained L digital complex I,Q samples 514 are supplied into an input of channel elements 504, 506, 508.

Each active mobile station communicating with the base station is serviced by one channel element, which performs digital signal processing both on the received signal and on the signal to be transmitted, as will be described in greater detail below. Each channel element comprises a ($\alpha$, $\tau$) receiver and a corresponding transmitter. The digital shaping functions of the antenna beam, realized by means of the signal phasing, are performed in a channel element both in the transmission direction and in the direction of reception.

In the direction of reception, a channel element filters the signal on the angle-space domain, demodulates the received signal components and combines them in a diversity combiner and in the end decodes the signal that has been received from the mobile station and that has been com- bined. The obtained user data bits are supplied further to a baseband unit 510, which forwards them to other parts of the network.

In the transmission direction, the user data bits arrive from the other parts of the network to the baseband unit 510, which forwards them to the correct channel element 504 to 508 where they are encoded, modulated by a spreading code and subjected to the phasing of the signal to be transmitted, the phasing determining the directions of the antenna beams to be transmitted. The obtained L signals are supplied to each of the L elements of the antenna array 502. In practice, the reception and transmission antenna arrays 500, 502 may be either separate or implemented by means of the same physical antenna array where the directions of transmission and reception are separated with suitable duplex filtration.

In the transmission antenna array 502, the signals that have arrived from each channel element and that are intended to each antenna element are converted into analog form, transferred to a radio frequency and transmitted via the antenna elements.

In the arrangement according to the invention, the transmission and reception antenna arrays may naturally comprise a different number of antenna elements, even though the description above discloses the same number L of elements in each group for the sake of simplicity. The figure also shows a control block 512, which controls the operation of the different units of the equipment, such as the allocation of the channel units to different connections according to the messages from the base station controller.

Figure 6:
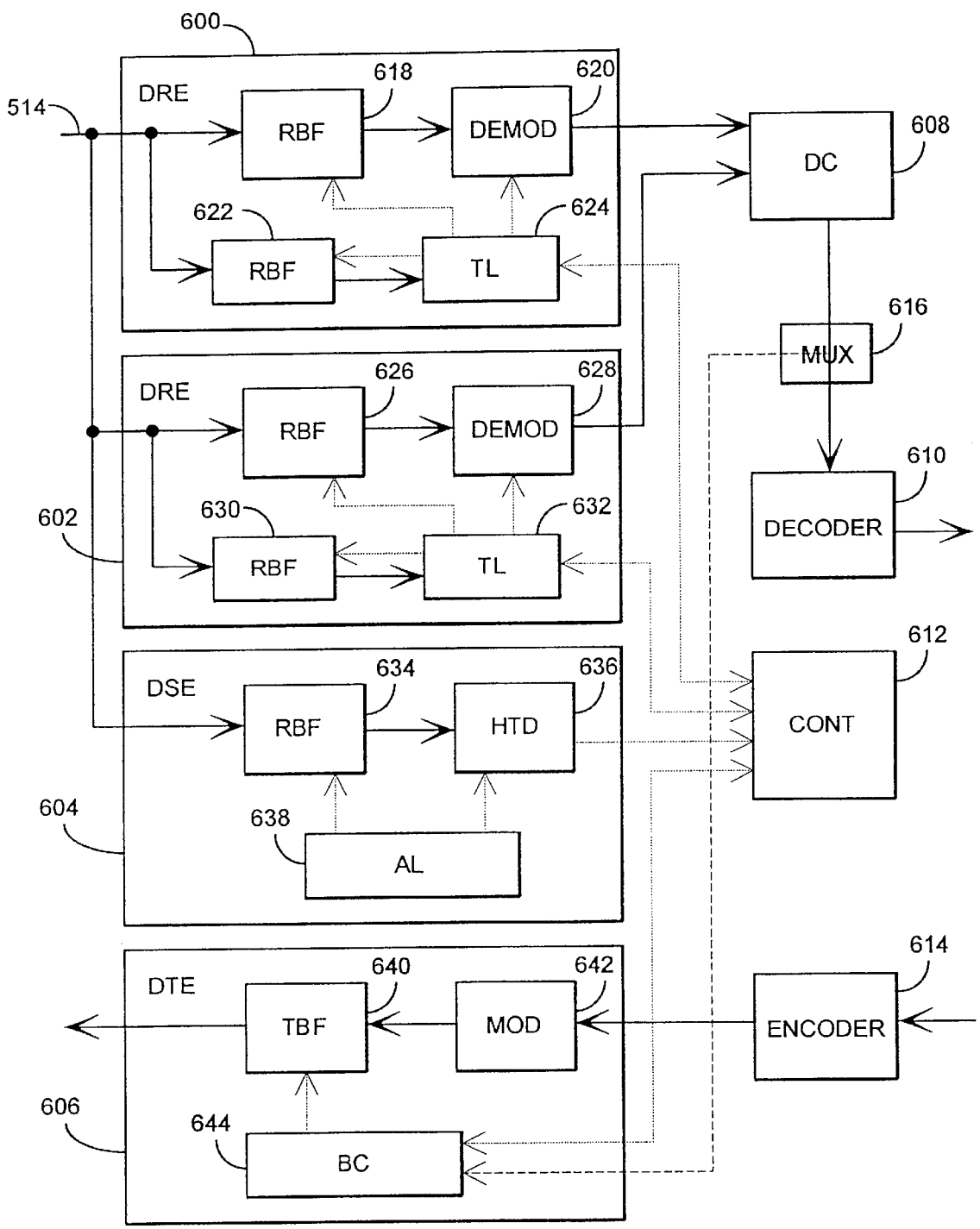
FIG. 6 is a block diagram illustrating an example of the structure of an individual channel element.

FIG. 6 is a block diagram illustrating the structure of a channel element in the equipment according to the first embodiment of the invention. The channel element comprises one or several digital receiver units 600, 602 two of which are shown in the figure, one or several searcher units 604 one of which is shown in the figure, a diversity combiner 608 the input of which comprises a signal from the receiver units, a decoder 610 to the input of which a signal that is visible at the output of the diversity combiner 608 is connected, and control means 612. The L digital complex I,Q samples 514 arriving from the antenna array are supplied to the input of all the digital receiver units 600, 602 and searcher units 604. If the arrangement according to the invention is applied in a transmitter-receiver, the transmitter-receiver according to the invention also comprises an encoder 614 and a digital transmission unit 606.

The operation of the digital searcher unit 604 is examined first with reference to FIG. 6. In the same way as in a conventional rake receiver, the function of the searcher unit is to search for the desired signal components from the received signal. In the arrangement according to the invention, a new type of searcher unit continuously monitors the received signal in the ($\alpha$, $\tau$) domain and searches for useful signal components and gives their parameters, i.e. the angle o,f arrival (AoA) and the delay profile, to the control means 612, which in turn allocate a required number of receiver units for demodulating the best components. The receiver according to the invention can naturally also be implemented in such a way that a channel element does not comprise separate control means 612, but the searcher unit 604 forwards the information concerning the signal components to be monitored directly to the receiver branches 600, 602.

The searcher unit comprises means 634 for phasing the signal supplied from the radio-frequency parts of the antenna array, and means 636 for detecting whether the signal obtained from the output of the phasing means 634 comprises a signal component received with the given delay and for measuring the quality of this signal component. The searcher unit further comprises means 638 for controlling the aforementioned phasing means 634 and the measuring means 636 in such a way that the incoming directions and delays of the received signal can be measured.

The means 634 for phasing the signal supplied from the radio-frequency parts of the antenna array can be implemented for example with equipment of the type described above and shown in FIG. 3, the equipment comprising the multiplication of the signal with complex coefficients $W_i$ (i=1, ..., L) by means of which it is possible to determine the angle of arrival of the signal that is visible amplified in the output signal of the phasing means. Each combination of the coefficients corresponds to a certain combination of antenna beams, as described above. The phasing means (634) are controlled by the means 638 so that all the essential incoming directions of the signal can be examined.

The output of the phasing means thus shows a signal that corresponds to the signal received from a given direction on the basis of the control of the means 638. The measuring means 636 perform a measurement with different delays on a signal visible at the output of the phasing means, the purpose of the measurement being to detect the signal components that have different delays. The delay to be measured each time is set with the aforementioned means 638. In the measuring means, the signal situated at the input of the means is subjected to despreading, measurement of the complex signal energy and squaring of the energy for example over the coherence time of the channel, and comparison of the obtained measurement result with the given threshold value. The parameters of the measured signal components having a strength exceeding the given threshold value, i.e. the angle of arrival, delay and power, are provided to the control means 612 of the channel element.

The means 638 thus control the operation of the phasing means 634 and the measuring means. The means 638 correspond to a synchronization loop provided in the searcher branch of a conventional rake receiver, even though in the arrangement according to the invention the means operate in a new manner. The search for the desired signal components from the ($\alpha$, $\tau$) domain can be implemented in many ways under the control of the means 638. As stated above, the measurement of the signal power can be replaced with some other measurement of the signal quality.

The digitized signal received by the antenna array can be phased in the phasing means 634 step by step in such a way that the direction angle of the greatest gain is changed with given angle intervals. From among the possible incoming directions, one selects a representative group of angles of arrival $\alpha_j$ which are situated at desired angle intervals from one another, and each incoming direction is subjected to several energy measurements at different delay values, whereby a delay profile $\tau_k$ is obtained for the incoming directions.

Another way is to direct the measuring means 636 to first measure the delay profile $\tau_k$ of the received signal for example with a non-directional antenna pattern. The possible delays with which signal components are received are thus detected. The phasing means 634 are thereafter directed to sweep the different direction angles with a narrow directional beam, and the measuring means are simultaneously guided to measure with the aforementioned delay values detected in the first measurement. The incoming directions $\alpha_j$ of the components that have arrived with different delays are thus obtained.

The parameters of the detected signal components are thus given to the control means 612 of the channel element. The control means allocate the receiver elements 600, 602 to receive and demodulate the best detected signal components by informing the receiver element of the incoming direction and delay of the signal component. As stated above, the receiver elements can also be controlled directly by the searcher unit 604 without separate control means.

The operation of the digital receiver unit 600, 602 will be examined next with reference to FIG. 6. In the same way as in a conventional rake receiver, the function of the receiver unit is to receive and demodulate a given signal component. Assume that the control means 612 of the channel element have allocated a receiver unit to receive a particular signal component the parameters of which are the angle of arrival $\alpha_j$ and the delay $\tau_k$.

The receiver unit 600, 602 comprises monitoring means 624, 632 to which the control means 612 of the channel element forward the information about the phase and incoming direction of the signal component to be monitored. The monitoring means control the first phasing means of the receiver unit the input of which is the digitized signal obtained from the antenna array. The phasing means 618, 626 have a similar structure as the phasing means 634 provided in the searcher unit. On the basis of the information that concerns the angle of arrival $\alpha_j$ and that is received from the control unit, the monitoring means set the complex weighting coefficients $W_i$ (i=1, ..., L) in such a way that a signal arriving from the desired incoming direction is visible at the output of the phasing means. This can thus be understood as a receiver antenna beam pointing in the desired direction and having a predetermined shape.

The receiver unit 600, 602 further comprises demodulation means 620, 628 the input of which comprises a signal obtained from the phasing means 618, 626. The monitoring means 624, 632 guide the demodulation means to synchronize with a signal component arriving with a given delay $\tau_k$. In the demodulation means, the signal is subjected-to despreading and demodulation according to known technology using the given $\tau_k$ as the code phase. The obtained symbols are supplied to the other parts of the channel element together with the delay data.

The receiver unit 600, 602 further comprises second phasing means 622, 630 the input of which comprises a digitized signal obtained from the antenna array. The output signal of the second phasing means is supplied to the monitoring means 624, 632. The monitoring means control the operation of the second phasing means by measuring with the means the environment of the current parameters ($\alpha_j$, $\tau_k$) of the signal component allocated to the receiver in order to detect possible changes in the incoming direction and delay of the received signal component. For this purpose, the second phasing means comprise complex coefficients similar to the first phasing means for phasing the signal, and means similar to the measuring means 636 situated in the searcher unit for measuring the impulse response. If the monitoring means detect, by means of the second phasing means, changes in the incoming direction $\alpha_j$ or delay $\tau_k$ of the desired signal component, they update this data to the first phasing means and to the demodulation means.

The prior art discloses several manners in which the monitoring means 624, 632 can be implemented in a spread spectrum system, for example Early-Late gates that can be used in the arrangement according to the invention. These circuits estimate the code timing error by performing two energy measurements with the given time difference Δτ, which is typically a fraction of the chip time of the spreading code in the environment of the current set point $\tau_k$. The energy measurements are performed with the measuring means of the second phasing means 622, 630, which provide the correction data required by the nominal set point $\tau_k$ as the delay changes.

Correspondingly, changes in the angle of arrival $\alpha_j$ of the signal can be monitored by means of the second phasing means. It is for example possible to perform, with the given delay $\tau_k$, two or more energy measurements with antenna beams which have been deflected by an angle Δα in both directions from the current angle of arrival $\alpha_j$ by means of phasing. The degree of the deflection Δα used is typically a fraction of the width of the antenna beam.

The monitoring means 624, 632 thus control the energy measurements performed by the second phasing means 622, 630, so that a signal could be received with the greatest possible energy at all times. The monitoring means update the data about the changed parameters ($\alpha_j$, $\tau_k$) to the first phasing means, to the demodulation means and also to the control means 612 of the channel element, so that the data could be used in the transmission direction, if required.

The above-described maximization of the received signal can be compared with the receiver antenna diversity used in conventional systems, wherein a signal is received with two or more antennas situated from each other at a distance having the length of several wavelengths of the received signal. In the receiver according to the invention, if a signal received with the angle of arrival $\alpha_j$ is caught in a deep and long fading situation, the fading can probably be eliminated by changing the angle of the receiver beam by a small angle Δα. There is thus no need for two separate antennas situated at a given distance from each other.

The operation of the diversity combiner 608 and the decoder 610 of thee channel element is similar as in the prior art diversity receivers. The combiner 608 combines the symbol sequences arriving from the different receiver elements by taking into account and compensating for their different delays $\tau_k$ and possibly by weighting the different symbol sequences according to their signal-to-noise ratios in order to obtain maximum ratio combination. The combined symbol sequence thus obtained is supplied to the decoder 610, which decodes the symbols to user data bits, usually performing the deinterleaving first. The CDMA applications generally use a strong convolutional coding for which the best method of detection is the Viterbi algorithm providing a soft decision.

It is clear that the above-described channel element can also be used for monitoring and receiving an access channel. The antenna beams used in the direction of reception have then wider antenna patterns, i.e. they can be for example 120° wide, since the exact location of the mobile stations transmitting call-set-up messages is not known.

The operation of the digital transmission unit 606 will be examined next with reference to FIG. 6. The user data bits are first supplied to the encoder 614, which encodes the bits typically with a convolutional code and performs interleaving on the encoded symbols. The obtained interleaved symbols are applied to a spread spectrum modulator 642, which performs conventional modulation. All the above-described functions can be performed according to known technology.

In the present invention, the transmission unit comprises means 644, 640, however, for controlling and phasing digitally the signal to be transmitted in response to the received signal. In the transmission unit according to the invention, the means 644 for adjusting the transmission beam receive from the control means 612 of the channel element information in their input about the incoming directions used in the different receiver units 600, 602 for receiving a signal from the mobile station. The control means 612 may also report the other incoming directions of the signal detected by the searcher unit 604, but not all the directions are necessarily used in the reception of the signal.

The means 644 of the transmission unit for adjusting the transmission beam control the phasing means 640, which calculate from predetermined beam-forming functions J×L complex weighting coefficients $W_{ij}$ (i=1, . . . L; j=1, . . . , J) which produce J antenna beams by means of L antenna elements. In addition to the direction and number of the antenna beams, the means 644 control the phasing means 640 by indicating the transmit power that is to be used with each beam and that the means 644 obtain from the control means 612 of the channel element.

The structure of the phasing means 640 may be similar to the phasing means 618, 626, 634 described above in the direction of reception. In the phasing means, the digitized (I,Q) samples of the outbound signal supplied from the modulation means 642 are thus multiplied by L complex weighting coefficients where L is the number of the antenna elements, as follows:

$$v_i = \sum_{j=1}^{J} g_j w_{ij}, \quad i = 1, \ldots, L$$

whereby L complex sample sequences are obtained for the antenna array. The complex multiplication also uses a real scaling factor $g_j$ (j=1, . . . , J), which is obtained from the adjusting means 644 and which can be used for the independent power adjustment of each antenna beam. The adjusting means 644 also indicate the frequency to be used, so that the weighting coefficients $W_{ij}$ can be set correctly.

The arrangement according to the invention uses special beam control information contained in a measurement report that a mobile station generates on the basis of the signal it has received and that it transmits to the base station either on a control channel or a traffic channel. The equipment according to the invention comprises means 616 for demultiplexing and detecting these measurement reports from the received signal. The detection can be performed already before the decoder 610 if a rapid response is desired. The aforementioned beam control information is forwarded to the adjusting means 644 of the transmission unit.

The means 644 for adjusting the transmission beam control the phasing means 640 on the basis of the information obtained from the control means of the channel element and the beam control information transmitted by the mobile station. The adjustment can be performed in many ways by modifying the parameters $\alpha_j$ and $g_j$ (j=1, . . . , J), in different ways. By means of the adjustment, the beam weightings can be changed so that the connection quality in the downlink direction can be made as good as possible. For example the transmit power used with some antenna beams can be independently adjusted, or the direction angle $\alpha_j$ of some antenna beams can be changed by a given angle Δα, or the number of the antenna beams used can be altered. With these measures it is possible to compensate for the deteriorations of signal quality, such as fadings, occurring over the radio path.

In the arrangement according to the invention, the adjusting means 644 of the transmission unit 606 can deflect the direction of one or several of the used antenna beams by small degrees Δα in the environment of the given direction angle $α_j$. Due to such deflection, it is possible to reduce the likelihood that the mobile station would be in a deep fading for a long time. Since the direction angle of an antenna beam continuously vibrates around a nominal direction angle $α_j$, a signal that has propagated over the radio path does not continuously use the same route. This method can be considered a new type of antenna diversity in the downlink direction.

Further, in the arrangement according to the invention the adjusting means 644 can control the phasing means 640 in such a way that a high-power signal having a wide antenna beam is obtained from the antenna array with the suitable adjustment of the weighting coefficients $W_{ij}$ (i=1, . . . , L; j=1, . . . , J) and the factors $g_j$ (j=1, . . . , J). The obtained antenna pattern may be for example a sector pattern or an omnidirectional pattern. For example a data-unmodulated pilot signal can thus be transmitted with a permanent antenna pattern. The same method can also be applied in the transmission of control channels.

Also in the arrangement according to the invention, the adjusting means 644 can control the phasing means 640 in such a way that with the suitable adjustment of the weighting coefficients $W_{ij}$ (i=1, . . . , L; j=1, . . . , J) and the factors $g_j$ (j=1, . . . , J), one or several signals having a rather narrow antenna beam are obtained from the antenna array, the angle of the greatest gain of the signal sweeping continuously the cell area. The obtained antenna pattern can be used for the transmission of a data-unmodulated pilot signal.

The second preferred embodiment of the invention, wherein the analog phasing of a received signal to be transmitted is applied in the CDMA system, will be described below.

Figure 7:
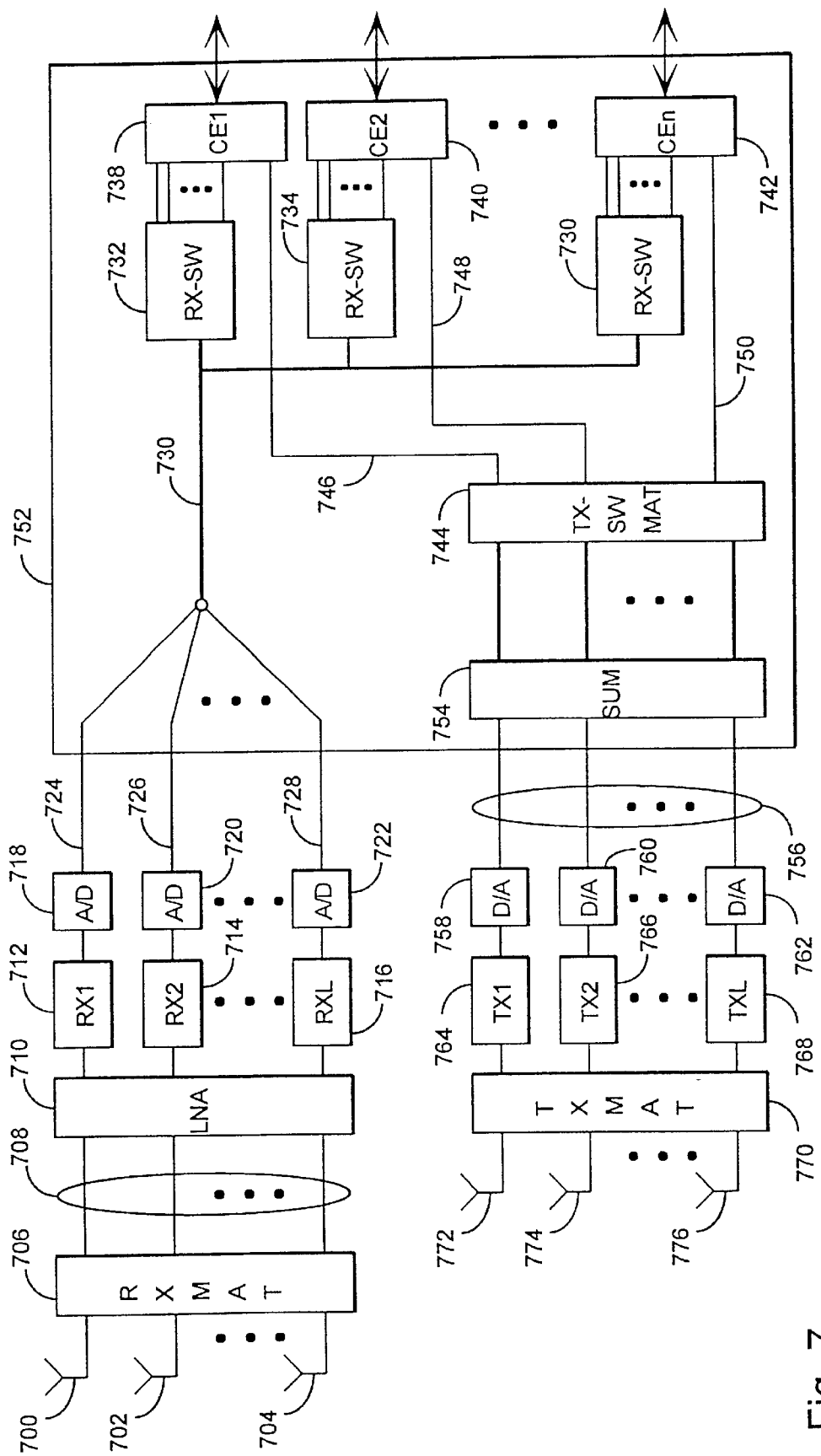
FIG. 7 is a block diagram illustrating another possible example of the equipment according to the invention.

FIG. 7 is a block diagram illustrating an example of the equipment according to the second preferred embodiment of the invention. The equipment comprises in the direction of reception a given number L of antenna elements 700 to 704 and in the transmission direction a group of antenna elements 772 to 776. In the transmitter-receiver, the transmission and reception antennas may be the same, whereby duplex filtration is used to separate the different transmission directions from one another. The figure shows different antenna elements for the different transmission directions. The group formed by the antenna elements may be linear, planar (two-dimensional) or omnidirectional. The antenna array receives a multipath-propagated signal that is delayed in different ways from several different directions with each of the L elements from each mobile station.

The antenna elements are connected to an RX matrix 706, which performs phasing on the analog signal received by the antenna elements in such a way that the matrix output 708 comprises K signal outputs each of which corresponds to a signal received by an antenna beam pointing in a predetermined signal incoming direction. The matrix can be implemented by means of prior art arrangements, such as a Butler matrix that is realized with passive 90° hybrids and phase shifters. The number K of the antenna beams produced with the matrix 706 does not necessarily correspond to the number L of the antenna elements.

The antenna beams are thus obtained in the direction of reception by phasing the signal received by the antennas and in the transmission direction by phasing the signal to be transmitted by the antennas. The antenna beams used are constant and their directions cannot be changed. The number of the antenna beams depends on the matrix 706 implementation and the beams can be set at desired angle intervals from one another and formed with a desired width.

The matrix output signals 708 are applied, if necessary, to a group of low-noise amplifiers 710, which compensate for the cable attenuations and other losses. The L signals amplified in this manner are supplied to the radio-frequency parts 712 to 716, which subject each signal to down-conversion into an intermediate frequency and to the required filtrations. The radio-frequency parts can be implemented in a manner according to known technology.

The intermediate-frequency signals are then applied to converter means 718 to 722, which convert the analog signal into digital samples. The conversion can be performed in manners according to known technology with commercially available components. Typically, complex sampling into I and Q components is performed in the means.

The output signals 724, 726, 728 of the converter means 718, 720, 722 are supplied further to a group of channel elements 738, 740, 742 via an RX switch 732, 734, 730 preceding each channel element. All the output signals 730 of the converters are applied to all the RX switches. Each RX switch thus comprises K inputs and one or several output signals that are applied to a corresponding channel element. The function of the RX switch is to guide a signal received by a desired antenna beam to a desired component of the channel element according to control from the channel element.

The above-described receiver structure can naturally also be implemented in such a way that one or several of the aforementioned parts (antenna elements 700–704, amplifiers 710, radio-frequency parts 712–716 and converter means 718–722) are located either integrated together or separately. In such a case, the details of the implementation vary, as it is evident for a person skilled in the art, for example in such a way that if the radio-frequency parts are situated in connection with an antenna array, there is no need for amplifiers 710.

Figure 8:
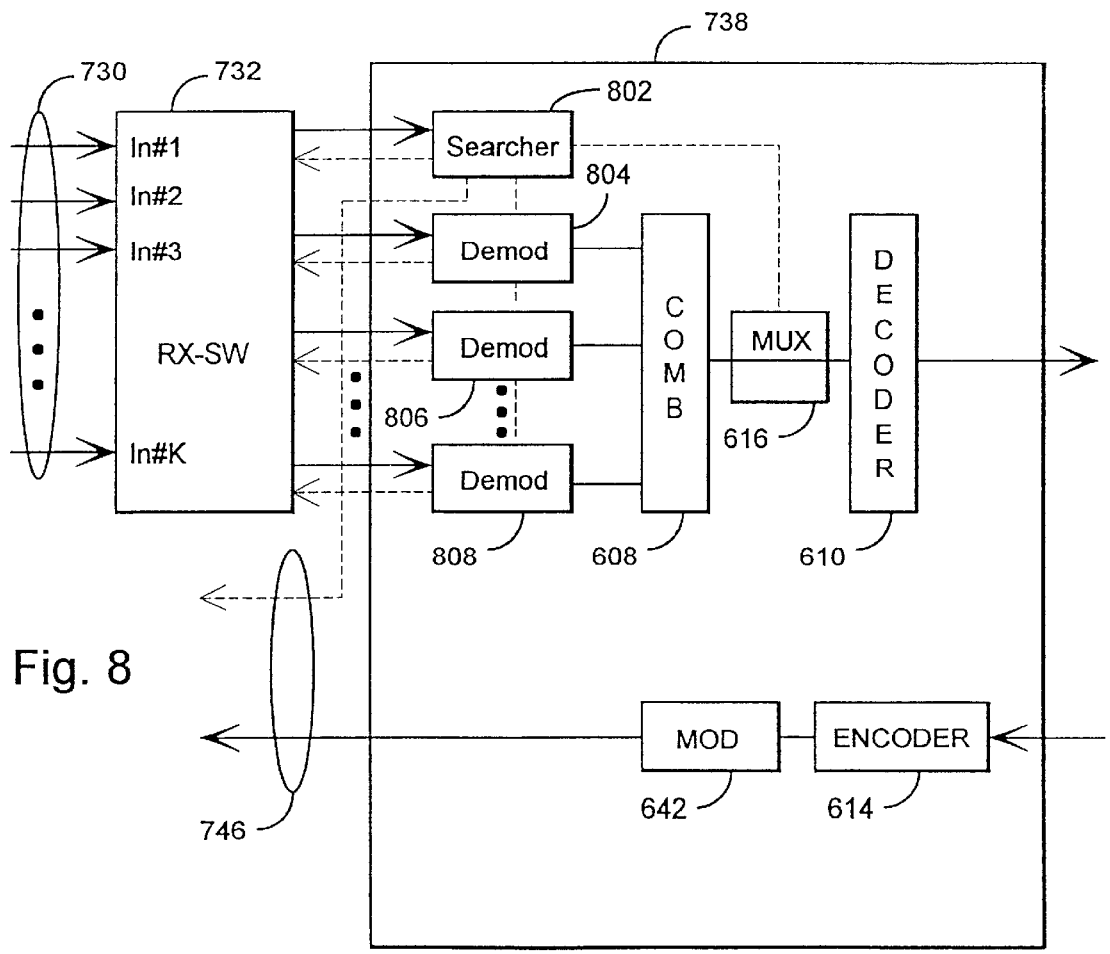
FIG. 8 illustrates a second example of the structure of an individual channel element.

In the following, the structure and operation of a channel element in a receiver according to the second embodiment of the invention will be described by means of the block diagram of FIG. 8. The channel element comprises one or several means 804, 806, 808 for demodulating a signal, the figure showing three of the means, one or several searcher units 802 one of which is shown in the figure, a diversity combiner 608 the input of which comprises a signal from the receiver units, and a decoder 610 to the input of which a signal visible at the output of the diversity combiner 608 is connected.

The inputs In#1 to In#K of the RX switch 732 thus comprise the K signals 730 from the converter means 718 to 722. The channel element 738 thus comprises a searcher unit 802 the function of which is to perform the search for the best signal components from the multidimensional signal domain, as described in connection with the searcher unit of the first embodiment. In the present embodiment, the searcher unit 802 searches for the best signal components from the inputs of the RX switch, each of which thus corresponds to a signal component arriving from a certain direction, by measuring the delay profile from each input of the RX switch. The measurement of the delay profile can be performed in the same manner as in the searcher branch of a conventional rake receiver. As a result of the measurement, the searcher unit thus detects the incoming directions and delays of the best signal components. The searcher unit guides the demodulation means 804, 806, 808 to synchronize with the best components by providing each demodulation means with information about the delay of the desired component and by applying the signal of this direction from the RX switch to the corresponding demodulation means.

The demodulation means 804, 806, 808 thus demodulate the given signal, monitor the changes in the delay and incoming direction of the signal, and start receiving a new antenna beam by means of the RX switch, if required. The output signals of the demodulation means are applied to a diversity combiner 608, which preferably combines the demodulated symbols and detects the information transmitted. The output signal of the diversity combiner is applied further to decoding means 610, which deinterleave the symbols and decode the information sequence.

The above-described receiver structure thus implements the arrangement according to the invention by means of analog phasing. In the reception, a number (K) of fixed antenna beams are produced by means of the phasing, the strongest signal components being selected for demodulation from the components received by the antenna beams. As the terminal equipment moves and the incoming directions of the signal change, the signal of the antenna beam providing the best signal strength is always selected for demodulation.

The transmitter structure according to the second preferred embodiment of the invention will be examined below with reference to FIG. 8.

The user data bits are first supplied to an encoder 614, which encodes the bits typically with a convolutional code and performs interleaving on the encoded symbols. The obtained interleaved symbols are applied to a spread-spectrum modulator 642, which performs conventional modulation. All the above-described functions can be performed according to known technology.

In the present invention, the transmitter implementation further comprises means 802 for controlling the analog phasing of the signal to be transmitted in response to the received signal. On the basis of the measurements it has performed, the searcher unit 802 knows the direction angles and the corresponding antenna beams which receive the best signal components. The searcher unit has thus allocated a group of demodulation means to receive these components. In a practical implementation, the control of the transmitting end can take place in the searcher unit or in a separate control unit. For the sake of simplicity, only the first alternative is described herein, without limiting the invention thereto, however. In any case, the idea of the invention is the same in both alternatives. As described above, in the arrangement according to the invention the detected incoming directions comprising a good signal level are used when transmitting a signal to the opposite transmission direction.

The implementation of the transmitter part will be examined below by means of FIG. 7. The transmitter comprises a given number L of antenna elements 772, 774, 776, which may thus be the same as the antenna elements in the direction of reception. The antenna elements are connected to a TX matrix 770 the function of which is to analogically phase the signal to be transmitted to different antenna elements so that the main beam of the directivity pattern points in the desired direction. The input of the TX matrix comprises K signals 756, which have been converted into analog form in D/A converters 758 to 762, converted into a radio frequency and amplified in radio-frequency parts 764 to 768. As already mentioned in connection with the description of the receiving end, the above-described components can be implemented in practice in several ways either together or separately, as it is clear for a person skilled in the art.

The TX matrix phases the K signals situated at the input in such a way that the antennas provide antenna beams to K different directions, the directions of the antenna beams being fixed and the beams covering together the desired area. The implementation of the TX matrix 770 is similar to the RX matrix 706 and it can be realized for example with a Butler matrix that is implemented with passive 90° hybrids and phase shifters. The number K of the antenna beams produced with the matrix 770 does not necessarily correspond to the number L of the antenna elements.

Figure 9:
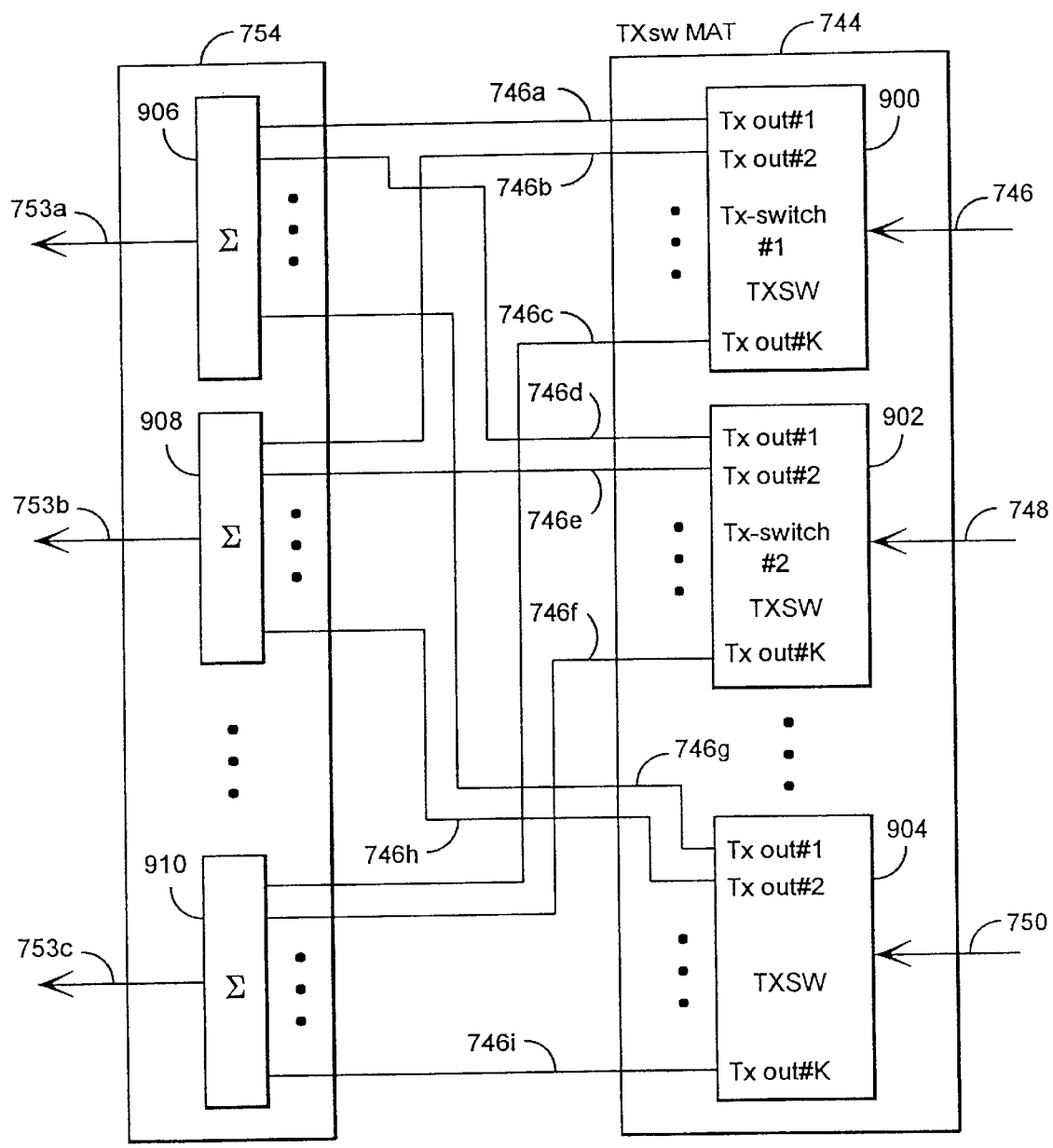
FIG. 9 illustrates more closely an example of the structure of an individual channel element.

The modulated data signal and the control 746 from the searcher unit are supplied from each channel element 738, 740, 742 to the TX switching matrix 744, from which the signals are supplied further to adding means 754. The operation of the switching matrix 744 and the adding means 754 will be examined in greater detail by means of FIG. 9.

The TX switching matrix comprises a TX switch 900, 902, 904 corresponding to each channel unit, the input of the switches consisting of both the modulated data signal that is to be transmitted and that arrives from the channel unit, and a control signal 746, 748, 750 from the searcher unit of the channel unit. The output of the TX switch comprises K outputs 746a to 746i, i.e. as many as there are transmission antenna beams. The function of each TX switch is to route the signal from the channel element to the correct transmission beams to be summed together with signals arriving from the other channel elements and intended to the same beam on-the basis of the control from the channel element. The TX switch guides the incoming data signal into one or several outputs Txout#1 to Txout#K, depending on the control from the channel element, i.e. depending on which antenna beams the signal is intended for. Each output is a quadratic digital sample weighted with the signal level.

Each output 746a to 746i of the switch is applied to one of the K adders 906 to 910 of the adding means 745. Each adder adds digitally together the data signals arriving from different channel units and intended for a given antenna beam. The required bit number for an outbound sample is obtained with the formula $2*(\log(n)+m)$, wherein n is the number of the inputs (channel units) of the adders, log is a two-based logarithm and m is the bit number of the samples.

Each of the outputs 756a to 756c of the TX switches is applied to a corresponding converter means 758 to 762 and further to antennas via an analog phasing matrix, as described above.

The second preferred embodiment of the invention utilizes special beam control information, which a mobile station generates on the basis of the signal that it has received and which is contained in a measurement report the mobile station adds to the signal it transmits to the base station. With reference to FIG. 8, the receiver according to the invention comprises means 616 for demultiplexing and detecting this measurement report from the received signal. The detection can be performed already before the decoder 610 in order to avoid delays. This beam control information is forwarded to the searcher unit 802 of the channel unit.

The searcher unit 802 selects the antenna beams to be used in the transmission on the basis of the information it has measured and the beam control information transmitted by the mobile station so that the connection quality in the downlink direction can be maximized.

In the second preferred embodiment of the invention, a pilot signal sweeping the cell area in the form of a narrow antenna beam can be implemented in such a way that the antenna beam used in the transmission of the pilot signal is changed so that the pilot signal is transmitted by using each antenna beam in turn, whereby the pilot signal sweeps the cell area in stages.

Even though the invention is described above with reference to the examples according to the accompanying drawings, it is clear that the invention is not restricted thereto, but it can be modified in many ways within the scope of the inventive idea disclosed in the appended claims.

The alignment of the antenna beams can be used for example in both the vertical and the horizontal direction, whereby the above-described ($\alpha$, $\tau$) domain can be understood as an ($\alpha$, $\beta$, $\tau$) domain, wherein $\alpha$ is the vertical angle, $\beta$ is the horizontal angle and $\tau$ is the delay.

One possibility is to utilize coherent, incoherent or differentially coherent modulation and demodulation methods in the channel elements. For example in order to enable coherent demodulation in a mobile station, the base station may include an additional spreading-coded signal without data modulation in each antenna beam as a phase reference. Alternatively, known reference symbols can be used for the same purpose.

One alternative embodiment of the invention includes positioning the digital phasing means 618 to 634 of the channel elements in one common phasing means block, which services all channel elements.

What is claimed is:

1. A base station for receiving a signal from, and transmitting a signal to a mobile station associated with a user, the signal from the mobile station arriving at the base station along several different paths and incurring several different delays, the base station comprising:

one or more antenna arrays each including several antenna elements, the antenna arrays transmitting the signal to and receiving the signal from the mobile station; and one or more channel units comprising means for phasing the transmitted signal in such a way that signal gain is greatest in a desired direction, and means for distinguishing data received from the mobile station into data relating to connection quality and received user data;

wherein each of the channel units further comprises means for searching the received signal and determining incoming directions and delays of the received signal components and means for controlling the phasing means when transmitting to the mobile station based on said determined incoming direction and delay data and on the data relating to the connection quality.

2. A base station according to claim 1, wherein the distinguishing means distinguishes the information transmitted by the mobile station into information concerning the number, quality and relative delays of the signal components received at the mobile station.

3. A base station according to claim 1, wherein the phasing means of the channel units weight the signal transmission directions in such a way that the connection quality in the downlink transmission direction is maximized.

4. A base station according to claim 1, wherein the base station further comprises a group of radio-frequency units coupled to the antenna array and the channel units comprise at least one means for phasing the signal received by the antenna array in such a way that the gain obtained from the antenna array is the greatest in the desired direction, and at least one means for demodulating the desired received signal component, the input of the demodulation means being the output signal of the phasing means, and means for searching for the incoming directions and delays of the received signal components, and means for controlling the phasing means and the demodulation means on the basis of information obtained from said means for searching.

5. A base station according to claim 4, wherein each channel unit further comprises a control unit regulating the operation of the channel unit, at least one receiver block and at least one searcher block, the input of the receiver and searcher blocks receiving a signal from the radio-frequency parts, and a diversity combiner, the input of which receives signals from the receiver blocks, and means for decoding the combined signal.

6. A base station according to claim 5, wherein the searcher block comprises phasing means the input of which is a signal from the radio-frequency parts, and means for detecting whether the signal received from a certain incoming direction and obtained from the phasing means comprises a desired signal component having a certain delay and for measuring the quality of said signal component, and means for controlling the phasing means and the measuring means in such a way that the desired incoming directions and delays of the signal to be received can be measured, and means for informing the control unit of the channel element of the incoming direction, delay, and quality of each detected signal component.

7. A base station according to claim 5, wherein the transmitter block comprises modulation means, the input of which includes a signal from the encoding means, phasing means, the input of which is a signal visible at the output of the modulation means, and means for controlling the phasing means in such a way that the greatest gain of the signal to be transmitted is oriented in the desired direction.

8. A base station according to claim 1, wherein the phasing means comprise means for multiplying the signal component received by the antenna element by a complex weighting coefficient that is specifically set for each component, the coefficients guiding the angle of the greater gain of a predetermined amplification pattern in the desired direction.

9. A base station according to claim 8, wherein the switching means guide the desired signals from the digitized outputs of the analog phasing means that have been converted into an intermediate frequency and that are visible in the input of the switching means to the desired means under control of the measuring means, the measuring means guiding each demodulation means to synchronize itself with the signal guided thereto.

10. A base station according to claim 8, wherein the receiver comprises means for amplifying the phased signal before digitizing.

11. A base station according to claim 8, wherein the phasing means, the radio-frequency units and the converter means are positioned physically in the same unit.

12. A base station according to claim 1, wherein the base station further comprises means coupled to the antenna array for analogically phasing the received signal in such a way that the gain from the antenna array is the greatest in the desired directions, a group of radio-frequency units the input of which comprises a phased signal, means coupled to the output of the radio-frequency units for digitizing the signal, one or more channel units the input of which comprises a digitized signal and each said unit comprising at least one measuring and switching means for searching the received signal for the antenna signals corresponding to the incoming directions of the best signal components and for measuring the delays of said components, and means for directing said components to the demodulation means of the channel unit.

13. A base station according to claim 12, wherein the base station comprises means coupled to the inputs of the antenna array for analogically phasing the signal to be transmitted with the antenna array in such a way that the gain from the antenna array is the greatest in the desired beam-like directions, a group of radio-frequency units coupled to the input of the phasing means and receiving the output signal of the signal digitizing means, and means for connecting the signal that is obtained from each said channel unit and that is to be transmitted to the antenna elements, and means coupled to the output of the switching means for adding together the signals transmitted to the antenna elements, the output of the adding means being connected to the input of the digitizing means.

14. A base station according to claim 12, wherein the analog phasing means comprises a number of outputs, each of which outputs a signal that is to be received by an antenna element pointing in a certain direction.

15. A method for steering an antenna beam in a base station, the method comprising:

receiving a signal at and transmitting a signal from the base station by means of an antenna array including several elements, the signals being phased in such a way that the gain from the antenna array is greatest in desired directions;

transmitting to the base station from a mobile station information about a quality of the signal received by the mobile station from the base station;

distinguishing received information about the quality of the signal from user data included in the signal received from the mobile station;

measuring incoming directions and delays of components of the signal received from the mobile station; and controlling phasing of the signal to be transmitted to the mobile station on the basis of said measurement and the connection quality information received from the mobile station.

16. A method according to claim 15, wherein the received signal is phased in such a way that the gain from the antenna array is the greatest in the desired direction, and the phasing and the phase of a demodulation means is controlled on the basis of said measuring.

17. A method according to claim 16, wherein incoming directions and delays of the signal components are measured from the received signal by phasing the received signal step by step in such a way that the gain from the antenna array is the greatest in the desired incoming direction with given angle intervals, and by measuring the strength of the signal component in each incoming direction with different phases of a spreading code.

18. A method according to claim 16, wherein the phasing of the signal to be transmitted and the angle of greatest gain of the predetermined amplification pattern is made to point in the desired direction.

19. A method according to claim 15, wherein the signal received by the antenna array is phased analogically in such a way that the gain from the antenna array is the greatest in the desired directions, and the phased signal is digitized and delays of components of the phased signal that are received more strongly are measured, and the desired signal components are guided by a switching means to a demodulation means, and the demodulation means synchronize themselves with said components.

20. A method according to claim 19, wherein the signal to be transmitted is phased analogically in such a way that the gain from the antenna array is the greatest in the desired directions, and the signal to be transmitted is guided by the switching means and an adder inputting the signal to the phasing means and that is to be transmitted to the desired directions.

21. A method according to claim 19, wherein the received signal is phased analogically to provide a group of signals directed in certain directions.

22. A base station for receiving a first signal from a mobile unit and transmitting a second signal to the mobile unit associated with a user, the first signal from the mobile unit arriving at the base station along several different paths and incurring several different delays, the base station comprising:

at least one antenna array to receive the first signal from and to transmit the second signal to the mobile unit, each of the at least one antenna array including several antenna elements; and at least one channel unit each including a phasing mechanism configured to phase the transmitted second signal in such a way that signal gain is greatest in a desired direction, and a distinguishing mechanism configured to distinguish data received from the mobile unit into data relating to connection quality and received user data;

wherein each of the at least one channel unit further comprises a searching mechanism to search the first signal and to determine incoming directions and delay data of the first signal and a controlling mechanism to control the phasing mechanism when transmitting to the mobile unit based on said determined incoming directions and delay data and on the data relating to the connection quality.

23. The base station according to claim 22, wherein the base station further comprises a group of radio-frequency units coupled to the at least one antenna array, and at least one demodulation mechanism for demodulating a desired received signal component, an input of the demodulation mechanism being an output of the phasing mechanism.

24. A base station according to claim 23, wherein each of the at least one channel unit further comprises a control unit regulating the operation of that channel unit, at least one receiver block and at least one searcher block, inputs of the receiver and searcher blocks receiving signals from radio-frequency parts, a diversity combiner to combine signals from the receiver block, and a decoder to decode the combined signal.

* * * * *